US008083628B2

(12) United States Patent
Soybel et al.

(10) Patent No.: US 8,083,628 B2

(45) Date of Patent: Dec. 27, 2011

(54) DIFFERENTIAL CARRIER ASSEMBLY FOR A VEHICLE

(75) Inventors: Zinovy Soybel, West Bloomfield, MI (US); William J. Duncan, Jr., Wolverine Lake, MI (US); Martin Hefter, Oxford, MI (US); Alvan J. Callahan, Walled Lake, MI (US); Richard F. Olenzek, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 314 days.

(21) Appl. No.: 12/355,863

(22) Filed: Jan. 19, 2009

(65) Prior Publication Data

US 2010/0184552 A1 Jul. 22, 2010

(51) Int. Cl.
*F16H 57/04* (2010.01)

(52) U.S. Cl. ........................................ 475/160; 475/230

(58) Field of Classification Search .................. 475/230, 475/231, 160; 74/607

See application file for complete search history.

(56) References Cited

U.S. PATENT DOCUMENTS 3,894,447 A * 7/1975 Michael ........................ 475/230
5,647,814 A * 7/1997 Krisher ......................... 475/230
7,294,084 B2 * 11/2007 Koehler et al. ............... 475/230
7,563,190 B2 * 7/2009 Chludek et al. ............... 475/230
7,591,751 B2 * 9/2009 Sudorowski et al. ......... 475/230
7,611,437 B2 * 11/2009 Valente ......................... 475/252
2004/0166985 A1 * 8/2004 Sudou ........................... 475/230
2005/0282677 A1 * 12/2005 Saito et al. .................... 475/230
2008/0045371 A1 * 2/2008 Donofrio et al. .............. 475/230
2009/0137357 A1 * 5/2009 Meier et al. ................... 475/230

FOREIGN PATENT DOCUMENTS

EP 0864779 A1 9/1998

* cited by examiner

*Primary Examiner* — Justin Holmes
*Assistant Examiner* — Huan Le
(74) *Attorney, Agent, or Firm* — Quinn Law Group, PLLC

(57) ABSTRACT

A differential carrier assembly for use in an axle of a vehicle includes a differential carrier that extends along a central axis. The differential carrier defines a chamber. A first stub shaft extends along a first rotational axis, transverse to the central axis. The first stub shaft is disposed within the chamber and is supported by the differential carrier. A first pair of gears is disposed in spaced relationship on the first stub shaft for rotation about the first rotational axis. A second stub shaft extends along a second rotational axis, transverse to the central axis and the first rotational axis. The second stub shaft is disposed within the chamber and supported by the differential carrier. A second pair of gears is disposed in spaced relationship on the second stub shaft for rotation about the second rotational axis.

12 Claims, 5 Drawing Sheets

16
22
50
70
52
76
53
50
26
78
24
53
52
62
48
38
54
56
46
R2
R1
44
46
60
28
C
34
68
30
80
32
40
42
36
48
54
56

10
20
76
38
52
16
22
26
70
66
48
28
30
44
50
48
R2
R1
66
36
68
32
80
C 14
48
56
58
80
82
12
44
R2
62
C
34
26
44
28
F
22
48
36
56
R1

28
C
34
68
80
32
44
R1
60
56
54
46
R2
48
38
46
78
26
50
53
76
52
62
64
52
53
24
53
40
40
70
50
22
36
48
54
56
16

DIFFERENTIAL CARRIER ASSEMBLY FOR A VEHICLE

TECHNICAL FIELD

The present invention relates to a differential carrier assembly for a vehicle.

BACKGROUND OF THE INVENTION

A typical differential carrier assembly includes a differential housing that extends along a central axis and defines a chamber. The differential housing includes a wall that extends along the central axis and radially surrounds the chamber. The wall extends to a cover that extends over the chamber. The differential housing is a single component. This means that the wall and the cover are integral to the housing. The differential housing is typically formed from cast iron. The wall defines at least one access hole that opens to the cavity and a pair of cross holes that open to the chamber. The pair of cross holes are defined on a rotational axis. A pair of side gears is inserted through the access holes and into the chamber. The side gears are disposed within the chamber to rotate about the central axis. A pair of bevel gears is also inserted through the axis holes and manipulated to be in spaced relationship on the rotational axis. A stub shaft is inserted through one of the cross holes, through each of the bevel gears, along the rotational axis and into the other of the cross holes such that the stub shaft engages both of the cross holes. Once the stub shaft is assembled to the wall of the housing, the bevel gears are in meshing engagement with each of the side gears for simultaneous rotation.

The cover of the differential housing includes a rim that extends about the central axis. Because the differential housing is formed from cast iron, a collar is pressed over the rim and a bearing is mounted over the collar for allowing rotation of the differential housing about the central axis.

SUMMARY OF THE INVENTION

A differential carrier assembly includes a differential carrier that extends along a central axis. The differential carrier defines a chamber. A first stub shaft extends along a first rotational axis, transverse to the central axis. The first stub shaft is disposed within the chamber and is supported by the differential carrier. A first pair of pinion gears is disposed in spaced relationship on the first stub shaft for rotation about the first rotational axis. A second stub shaft extends along a second rotational axis, transverse to the central axis and the first rotational axis. The second stub shaft is disposed within the chamber and supported by the differential carrier. A second pair of pinion gears each disposed in spaced relationship on the second stub shaft for rotation about the second rotational axis.

A gear assembly is provided for a differential carrier assembly having a differential carrier that extends along a central axis and defining a chamber. The gear assembly includes a first stub shaft that extends along a first rotational axis, transverse to the central axis. The first stub shaft is disposed within the chamber and is for being supported by the differential carrier. A first pair of pinion gears is disposed in spaced relationship on the first stub shaft for rotation about the first rotational axis. A second stub shaft extends along a second rotational axis, transverse to the first rotational axis and the central axis. The second stub shaft is disposed within the chamber and is supported by the differential carrier. A second pair of pinion gears is disposed in spaced relationship on the second stub shaft for rotation about the second rotational axis.

By forming a differential carrier to include a separate cover, the pinion gears may be inserted into the cavity before the cover is attached to the differential carrier. This allows more gears to be inserted into the cavity. In addition, the differential carrier and the cover may be formed from separate materials and without a sleeve that is typically used to support bushings or bearings.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
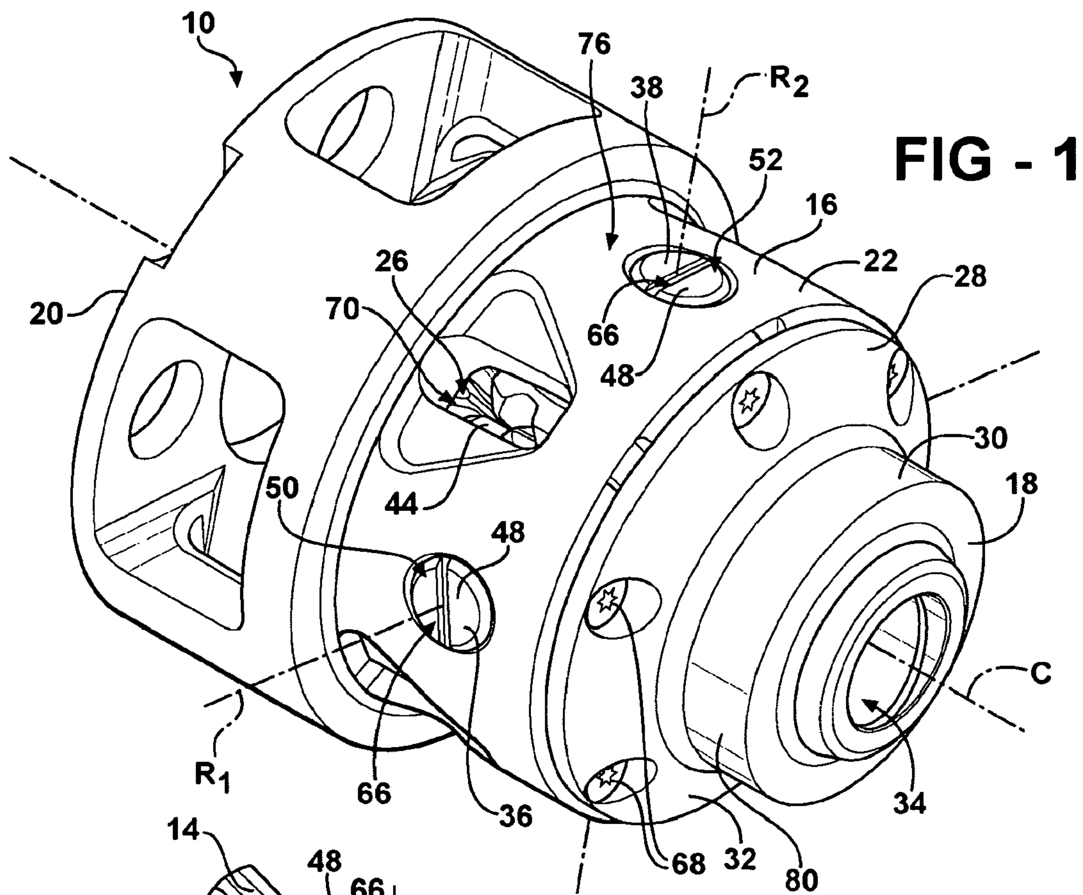
FIG. 1 is a perspective view of a differential carrier assembly having a differential carrier and a cover mounted to the differential carrier.
Figure 3:
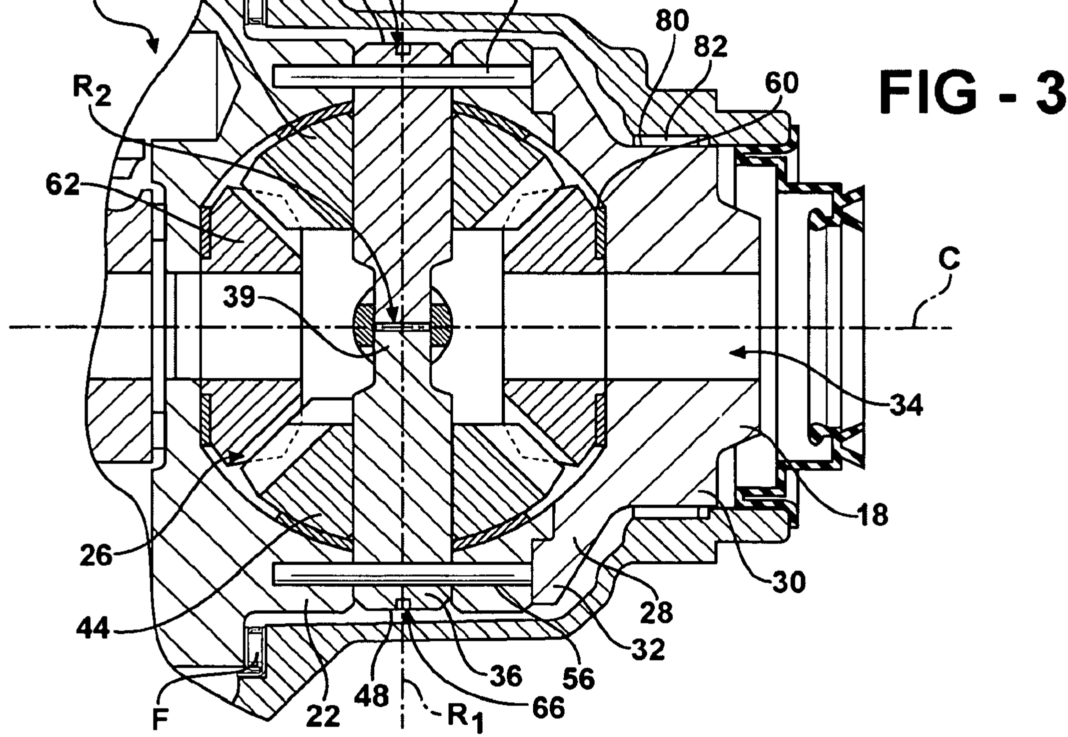
FIG. 3 is a partial cross sectional side view of an axle housing with the differential carrier assembly disposed therein.
Figure 6:
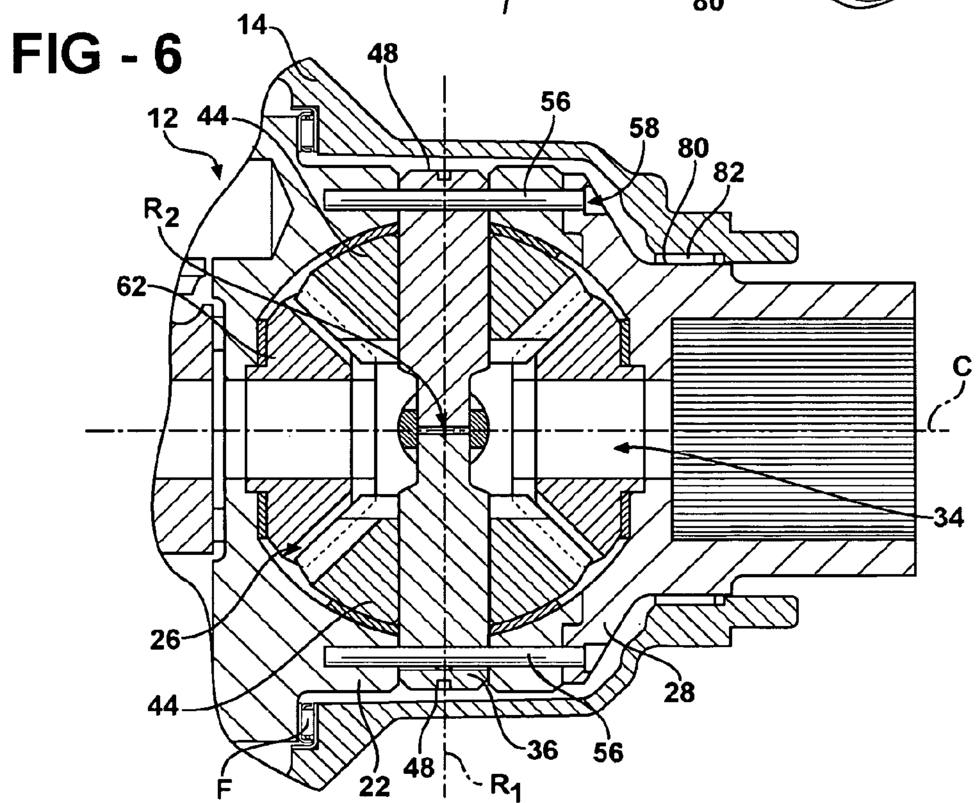
FIG. 6 is a partial cross sectional side view of the axle housing with the differential carrier assembly of FIG. 4 disposed therein.

Referring to the drawings, wherein like reference numbers refer to like components, FIG. 1 shows a differential carrier assembly 10. Referring to FIGS. 3 and 6, the differential carrier assembly 10 may be used in an axle 12 of a vehicle (not shown) for differentiating rotational speed between different wheels (not shown) of the vehicle. The axle 12 includes a housing 14 and the differential carrier assembly 10 is operatively enclosed within the housing 14. It should be appreciated, however, that the differential carrier assembly 10 is not limited to being used inside of an axle 12, but may be used in any other application known to those skilled in the art which requires differentiation of rotational speed.

A differential carrier assembly 10 includes a differential carrier 16 that extends along a central axis C between a first end 18 and a second end 20, as shown in FIG. 1. A pair of drive shafts (not shown) may extend from the first and second ends 18, 20 of the differential carrier 16. The drive shafts may be rotatably connected to the respective wheels of the vehicle.

Figure 2:
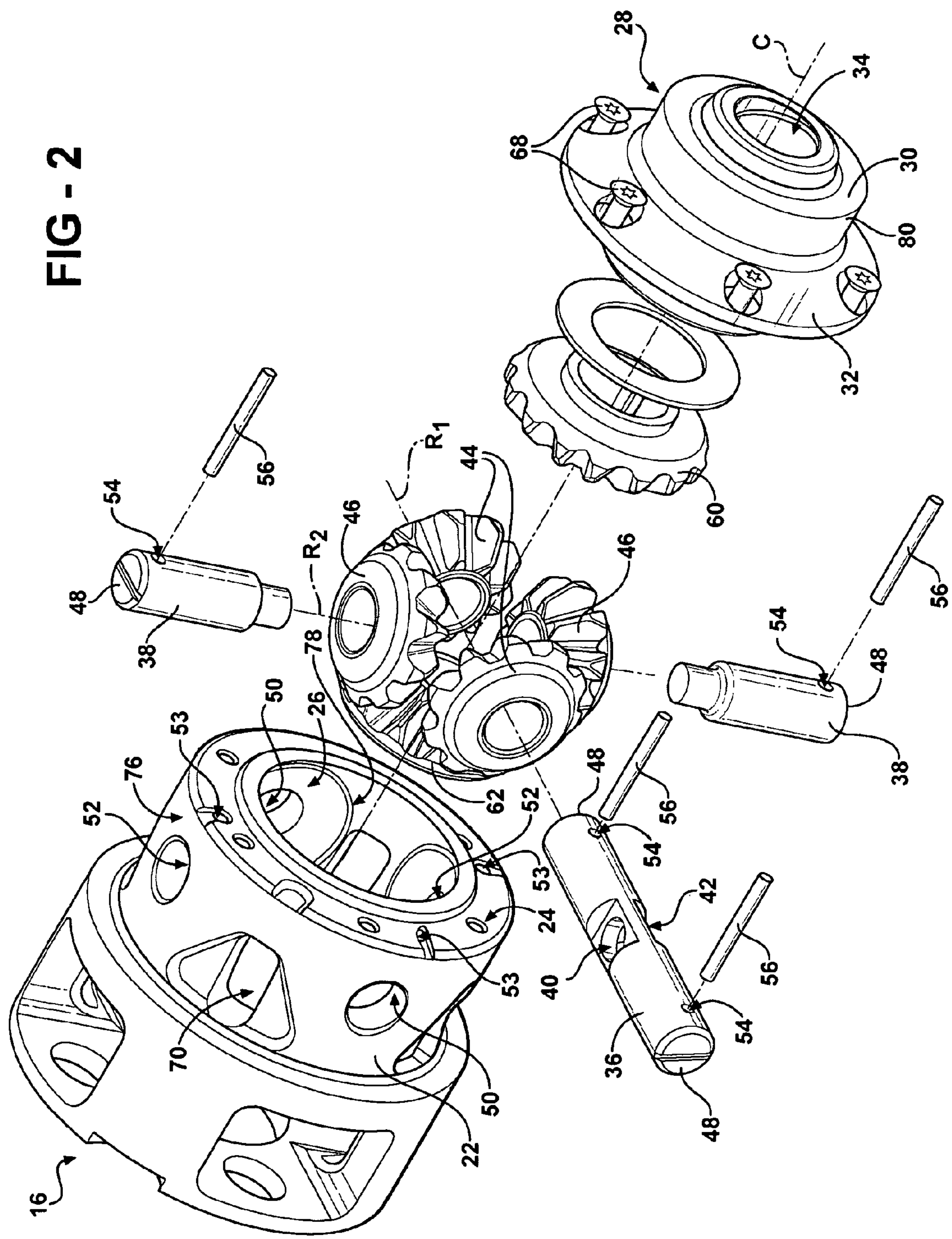
FIG. 2 is an exploded perspective view of the differential carrier assembly.
Figure 4:
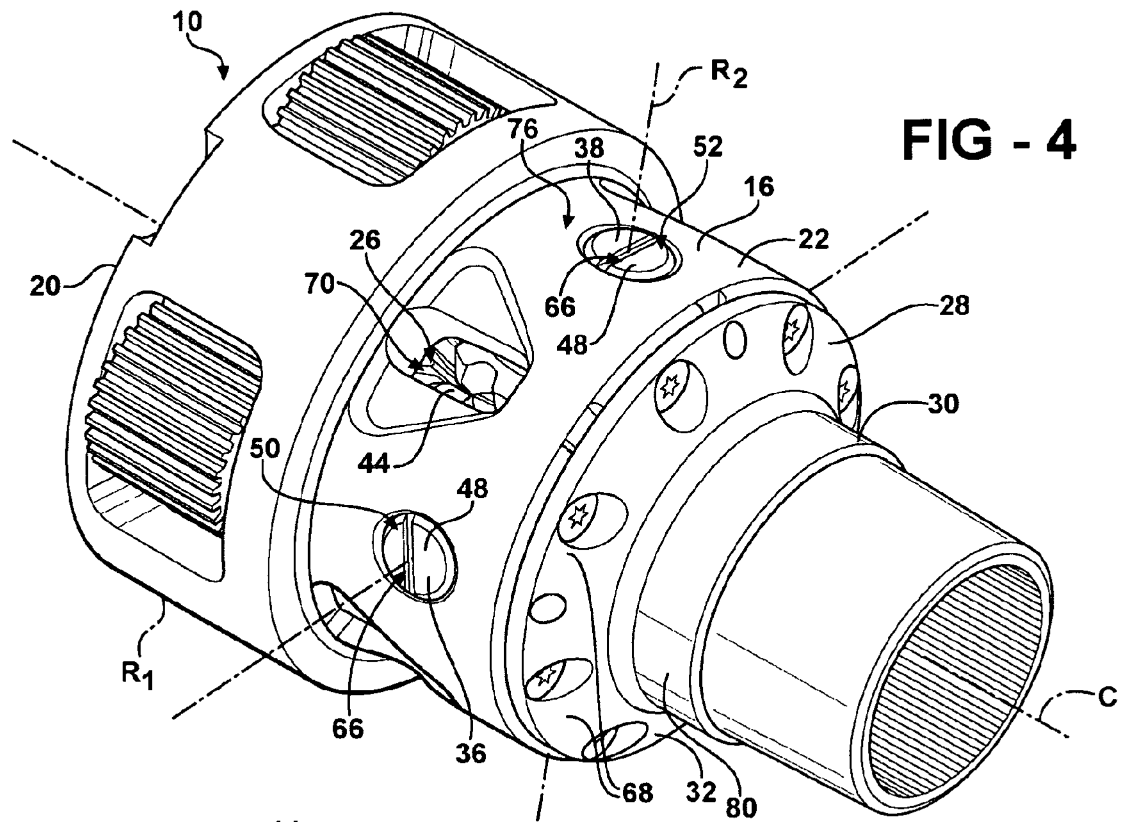
FIG. 4 is a perspective view of an alternative embodiment of the differential carrier assembly having the differential carrier and the cover mounted to the differential carrier where the cover defines a plurality of secondary holes for receiving roll pins.

Referring now to FIGS. 1-3, the differential carrier 16 includes a wall 22 that extends along the central axis C to a mounting surface 24. The differential carrier 16 defines a chamber 26 and the wall 22 surrounds the chamber 26 and the central axis C. The wall 22 may be formed from cast iron. It should be appreciated, however, that the wall 22 is not limited to being formed from cast iron, and may also be formed from any other suitable material known to those skilled in the art. The differential carrier 16 also includes a cover 28 that extends over the mounting surface 24 of the wall 22 to at least partially cover the chamber 26. The cover 28 may be formed from steel. It should be appreciated, however, that the cover 28 is not limited to being formed from steel, and may also be formed from any other suitable material known to those skilled in the art. The cover 28 includes a central portion 30 that surrounds the central axis C. A flange 32 radially extends from the central portion 30 and is disposed to extend over the mounting surface 24 to at least partially cover the chamber 26. The central portion 30 also defines an access hole 34 that extends therethrough, along the central axis C, and opens to the chamber 26. Optionally, a groove 35 may be defined within the access hole for providing lubrication through the access hole 34.

Referring to FIG. 2, a first stub shaft 36 extends along a first rotational axis R1, transverse to the central axis C. The first rotational axis R1 intersects the central axis C. The first stub shaft 36 is disposed within the chamber 26 and is supported by the wall 22 of the differential carrier 16. A second stub shaft 38 extends along a second rotational axis R2, transverse to the central axis C and the first rotational axis R1. Each of the second stub shafts define a post 39. The second rotational axis R2 intersects the central axis C and the first rotational axis R1. The second stub shaft 38 is disposed within the chamber 26 and is supported by the wall 22 of the differential carrier 16. In one embodiment, the second stub shaft 38 may be a pair of second stub shafts 38 where each of the second stub shafts 38 are disposed on opposing sides 42 of the first stub shaft 36. The first stub shaft 36 defines a hole 40 on opposing sides 42. The post 39 of each of the second stub shafts 38 extend at least partially into the hole 40, on opposing sides of the first stub shaft 35. Therefore, the hole 40 supports a portion of each of the second stub shafts 38 such that the first stub shaft 36 and each of the second stub shafts 38 intersect to form a cross-shape. It should be appreciated however, that the intersection of the stub shafts 36, 38 to form the cross-shape is not limited to having a pair of second stub shafts 38 that are supported by a single hole 40 of the first stub shaft 36. For example, a single stub shaft 38 that extends through the first stub shaft 36 may also be used, as known to those skilled in the art.

Referring again to FIG. 2, a first pair of pinion gears 44 is disposed in spaced relationship on the first stub shaft 36 for rotation about the first rotational axis R1. A second pair of pinion gears 46 is disposed in spaced relationship on each of the second stub shafts 38 for rotation about the second rotational axis R2. The first and second pair of pinion gears 44, 46 may be bevel gears. It should be appreciated, however, that other types of gears known to those skilled in the art may also be used. Each of the first and second pinion gears 44, 46 are arranged such that each of the first pair of pinion gears 44 is in meshing relationship with each of the second pair of pinion gears 46. This means that each of the first and second pinion gears 44, 46 rotate in unison about their respective first and second rotational axes R1, R2.

A first side gear 60 may be disposed on the central axis C, for rotation about the central axis C, as shown in FIGS. 2 and 3. The first side gear 60 is in meshing relationship with each of the first and second pinion gears 44, 46. A second side gear 62 may be disposed on the central axis C, for rotation about the central axis C. The second side gear 62 is disposed in opposition to the first side gear 60, such that each of the first and second pinion gears 44, 46 are disposed between the first and second side gears 60, 62. Therefore, each of the first and second side gears 60, 62 are disposed on the central axis C, within the chamber 26, transverse to each of the first and second pinion gears 44, 46 such that as each of the first and second pinion gears 44, 46 rotate about their respective first and second rotational axes R1, R2, each of the first and second side gears 60, 62 rotate in opposing directions about the central axis C. In addition, a washer 63 may be disposed between each of the side gear 60, 62 and the differential carrier 16.

Each of the stub shafts 36, 38 extend between opposing ends 48, as shown in FIG. 2. The wall 22 of the differential carrier 16 defines a first pair of cross holes 50 on the first rotational axis R1 in spaced and opposing relationship. Each of the first cross holes 50 open to the chamber 26. This means that each of the first pair of cross holes 50 are defined on opposing sides of the chamber 26. Each end 48 of the first stub shaft 36 extends into a respective one of the first pair of cross holes 50, such that the wall 22 of the differential carrier 16 supports the first stub shaft 36 on the first rotational axis R1. The wall 22 of the differential carrier 16 defines a second pair of cross holes 52 on the second rotational axis R2 in spaced and opposing relationship. Each of the second cross holes 52 open to the chamber 26. This means that each of the second pair of cross holes 52 are defined on opposing sides of the chamber 26. One of the ends 48 of each of the second stub shafts 38 extends into a respective one of the second pair of cross holes 52 such that the differential carrier 16 supports each of the second stub shafts 38 on the second rotational axis R2.

Referring again to FIG. 2, the first and second stub shafts 36, 38 each define at least one retention hole 54, proximate one of the respective ends 48 of the first and second stub shafts 36, 38. The retention hole 54 may extend generally transverse to the rotational axes R1, R2 when the stub shafts 36, 38 are disposed within the differential carrier 16. The wall 22 of the differential carrier 16 defines at least one pin hole 53 opening to a respective one of the first and/or second pair of cross holes 50, 52. The pin hole 53 may extend through the wall 22 in spaced and generally parallel relationship to the central axis C. A roll pin 56 extends through the retention hole 54 of the second stub shaft 38 and the pin hole 53 of the wall 22 of the differential carrier 16 to retain the respective stub shaft 36, 38 to the differential carrier 16. In another embodiment, shown in FIGS. 4-6 and 8, the wall 22 defines the pin hole 53 and the flange 32 defines at least one secondary hole 58 that is aligned with the pin hole 53. The roll pin 56 extends through each of the pin hole 53, the secondary hole 58, and the retention hole 54 to retain the respective stub shaft 36, 38 to the wall 22 of the differential carrier 16.

Figure 5:
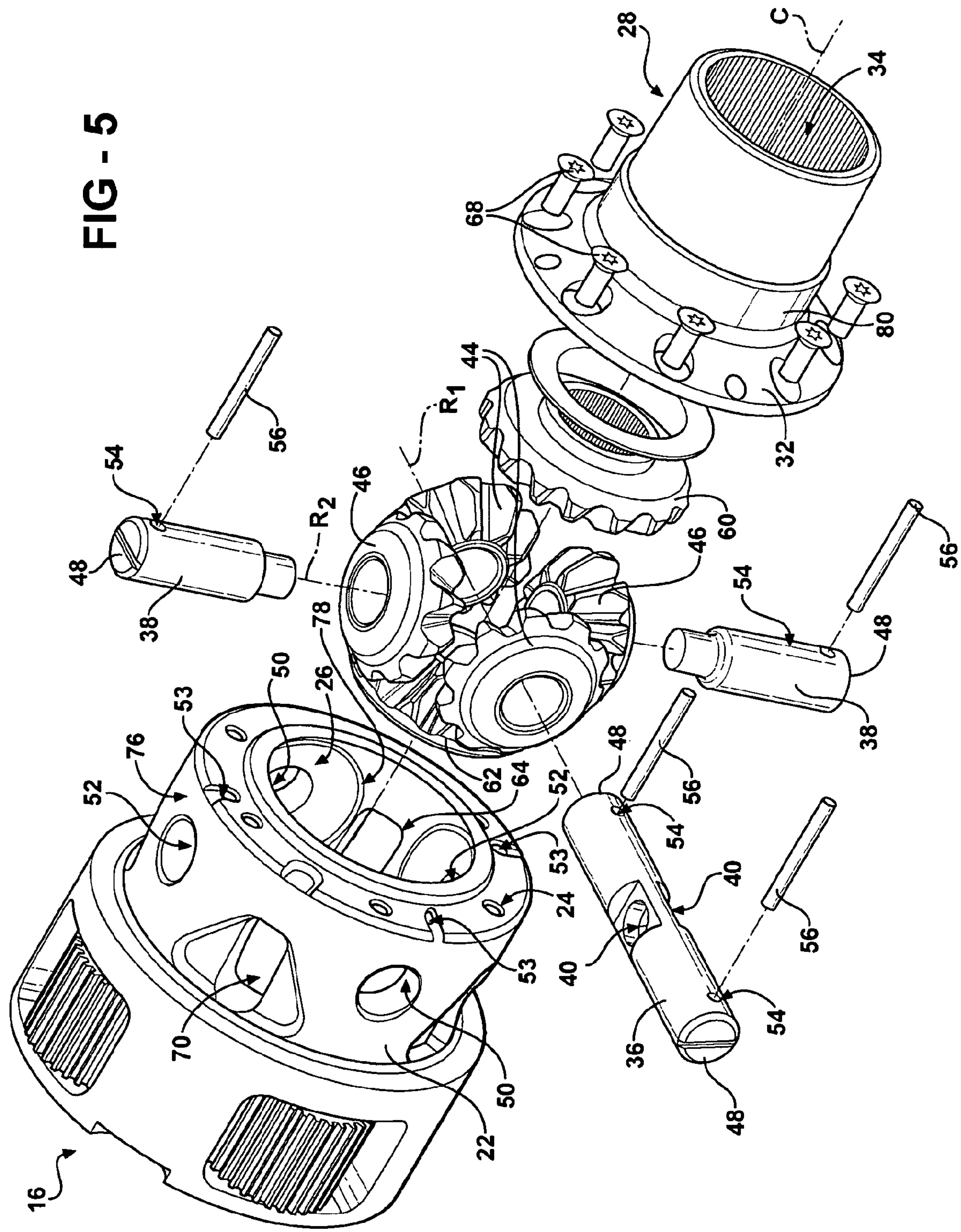
FIG. 5 is an exploded perspective view of the differential carrier assembly of FIG. 4.

The differential carrier assembly 10 may be assembled by inserting each of the pinion gears 44, 46 and side gears 60, 62 into the chamber 26 through an assembly opening 64, defined by the mounting surface 24 of the wall 22 of the differential carrier 16, as shown in FIGS. 2 and 5. Each of the respective stub shafts 36, 38 are inserted, i.e., by pressing and the like, through the respective cross holes 50, 52 of the wall 22 of the differential carrier 16, and into the chamber 26. At least one of the ends 48 of the stub shafts 36, 38 defines an orientation indicator 66 for orienting the respective stub shaft 36, 38 relative to the differential carrier 16. The stub shafts 36, 38 may be oriented, using the orientation indicators 66, to ensure that each of the retention holes 54 are in alignment with the respective pin holes 53, defined in the wall 22 of the differential carrier 16. Once the stub shafts 36, 38 are aligned relative to the differential carrier 16, the roll pins 56 may be inserted through the respective pin holes 53 and retention holes 54 to retain the stub shafts 36, 38 to the differential carrier 16. The flange 32 of the cover 28 is placed over the mounting surface 24 of the differential carrier 16 and at least one fastener 68 is inserted through the flange 32 and into the wall 22 of the differential carrier 16 to retain the cover 28 to the differential carrier 16. In an alternative embodiment, shown in FIGS. 4-6 and 8, the cover 28 is placed over the mounting surface 24 prior to inserting the roll pins 56 through the respective pin holes 53 and retention holes 54. In this embodiment, after the cover 28 is attached to the wall 22 of the differential carrier 16, the roll pins 56 are inserted through each of the secondary holes 58 defined in the flange 32 of the cover 28, the pin holes 53, and retention holes 54. Therefore, the roll pins 56 engage the wall 22 of the differential carrier 16 and the flange 32 of the cover 28 to provide additional strength when retaining the respective roll pins 56 within the stub shafts 36, 38 of the differential carrier 16.

Figure 7:
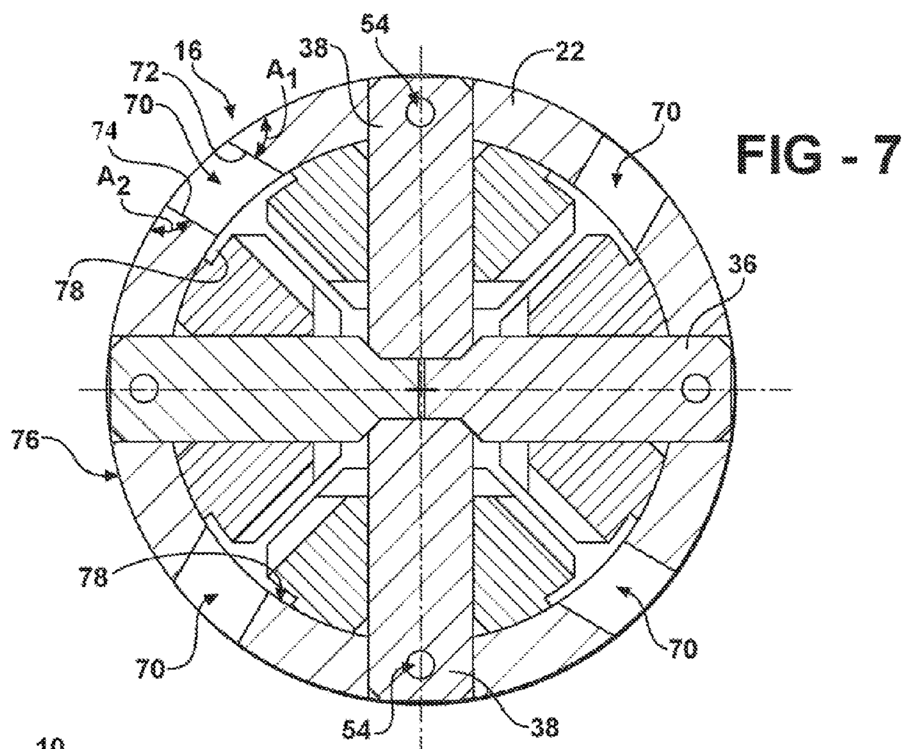
FIG. 7 is a cross sectional end view of the differential carrier of the differential carrier assembly where the differential carrier is supporting a first stub shaft and a pair of second stub shafts intersecting the first stub shaft and the differential carrier defines a plurality of lubrication holes.
Figure 8:
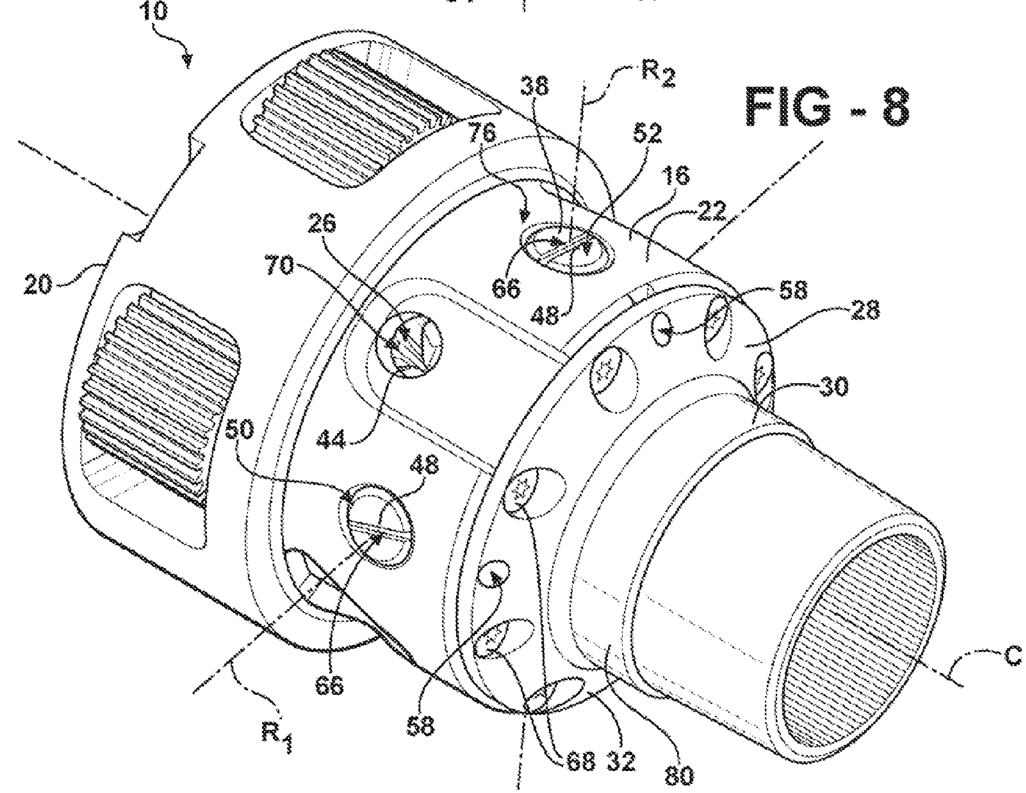
FIG. 8 is a perspective view of another embodiment of the differential carrier assembly having circular lubrication holes defined in the differential carrier.

Referring to FIG. 7, the wall 22 defines at least one lubrication hole 70 that opens to the chamber 26. The differential carrier 16 includes an outer surface 76 and an inner surface 78, opposing the outer surface 76. The inner surface 78 surrounds the chamber 26. The lubrication hole 70 extends through the wall 22 from the outer surface 76 to the inner surface 78. In a cross section of the wall 22 of the differential carrier 16, taken transversely through the central axis C, the lubrication hole 70 includes a first edge 72 and a second edge 74 extending in spaced and parallel relationship to the first edge 72. Each of the first edge 72 and the second edge 74 extend between the outer surface 76 and the inner surface 78. The first edge 72 extends at a first angle A1, relative to the outer surface 76, and the second edge 74 extends at a second angle A2, relative to the outer surface 76. The first angle A1 may be an acute angle and the second angle A2 may be an obtuse angle. The angular relationship between the first and second edges 72, 74 and the outer surface 76 allows each of the lubrication holes 70 to scoop and direct a fluid F, disposed within the axle housing 14, into the chamber 26 of the differential carrier 16 to lubricate each of the side gears 60, 62 and pinion gears 44, 46 as the differential carrier 16 rotates about the central axis C, relative to the axle housing 14. Referring generally to FIGS. 1, 2, 4, and 5, the lubrication hole 70 is generally rectangular. In another embodiment, shown in FIG. 8, the lubrication hole 70 is circular. It should be appreciated, however, that lubrication holes 70 having different shapes may also be used as known to those skilled in the art.

As stated above, the cover 28 may be formed from steel. A collar 80 may be integrally formed on the cover 28. The steel cover 28 allows the collar 80 to provide a smooth surface that extends from the central portion 30 and surrounds the central axis C. The collar 80 may directly support a bearing 82, as shown in FIGS. 3 and 6. This means that the bearing 82 may be directly mounted to the surface of the collar 80, without having to use an additional sleeve that is typically required when the cover 28 is formed from cast iron or other similar materials. The bearing 82 rotatably interconnects the first end 18 of the differential carrier assembly 10 to the axle housing 14 such that the differential carrier assembly 10 rotates about the central axis C, relative to the axle housing 14.

While the best modes for carrying out the invention have been described in detail, those familiar with the art to which this invention relates will recognize various alternative designs and embodiments for practicing the invention within the scope of the appended claims.

The invention claimed is:

1. A differential carrier assembly, said assembly comprising:

a differential carrier extending along a central axis wherein said differential carrier defines a chamber;

wherein said differential carrier includes a wall surrounding said central axis and at least partially defining said chamber;

a first stub shaft extending along a first rotational axis, transverse to said central axis, wherein said first stub shaft is disposed within said chamber;

wherein said wall of said differential carrier defines a first pair of cross holes on said first rotational axis in spaced and opposing relationship to one another and said first stub shaft extends between opposing ends, wherein each of said ends of said first stub shaft extends into a respective one of said first pair of cross holes such that said wall of said differential carrier supports said first stub shaft;

a first pair of pinion gears disposed in spaced relationship to one another on said first stub shaft and configured for rotation about said first rotational axis;

a pair of second stub shafts extending along a second rotational axis, transverse to said central axis and said first rotational axis, wherein each of said pair of second stub shafts is disposed within said chamber;

wherein said wall of said differential carrier defines a second pair of cross holes on said second rotational axis in spaced and opposing relationship to one another, and said pair of second stub shafts extends between opposing ends, wherein each of said ends of said pair of second stub shafts extends into a respective one of said second pair of cross holes such that said wall of said differential carrier supports said pair of second stub shafts; and a second pair of pinion gears disposed in spaced relationship to one another on a respective one of said pair of second stub shafts and configured for rotation about said second rotational axis;

wherein said wall of said differential carrier defines a pin hole opening to each of said first pair and said second pair of cross holes;

wherein said first stub shaft defines a retention hole proximate each of said ends and said retention holes extends generally transverse to said first rotational axis;

wherein each of said pair of second stub shafts defines a retention hole proximate each of said ends and said retention holes extending generally transverse to said second rotational axis;

wherein said ends of said first stub shaft and each of said pair of second stub shafts define an orientation indicator configured for orienting said retention holes of each of said first and second stub shafts within said respective first pair and said second pair of cross holes, relative to said respective pin hole defined in said wall of said differential carrier, such that each of said retention holes is aligned with one of said respective pin holes; and a plurality of roll pins, wherein one of said roll pins extends through a respective one of said retention holes and said pin holes when said retention holes are aligned with said respective pin holes;

wherein said wall defines at least one lubrication hole opening to said cavity, wherein said lubrication hole extends through said wall for scooping and directing a fluid into said cavity as said differential carrier rotates about said central axis;

wherein said wall includes an outer surface surrounding said chamber and an inner surface opposing said outer surface, whereby said lubrication hole extends through said wall from the outer surface to said inner surface;

wherein said lubrication hole includes a first edge and a second edge extending in spaced relationship to said first edge;

wherein each of said first edge and said second edge extend between said outer surface and said inner surface;

wherein said first edge extends at a first angle relative to said outer surface and said second edge extends at a second angle relative to said outer surface;

wherein said first angle is an acute angle and said second angle is an obtuse angle such that said lubrication hole is configured to scoop and direct fluid into said chamber of said differential carrier as said differential carrier rotates about said central axis.

2. A differential carrier assembly, as set forth in claim 1, wherein said first stub shaft defines a hole extending therethrough and each of said second stub shafts include a post wherein said post of each of said stub shafts at least partially extend into said hole on opposing sides of said first stub shaft.

3. A differential carrier assembly, as set forth in claim 1, wherein said first pair of pinion gears are a first pair of bevel gears and said second pair of pinion gears are a second pair of bevel gears such that each of said first bevel gears are in meshing relationship with each of said second bevel gears for simultaneous rotation of all of said first and second bevel gears about said respective rotational axes.

4. A differential carrier assembly, as set forth in claim 1, further comprising a first side gear disposed on said central axis wherein said first side gear is in meshing relationship with each of said first and second gears.

5. A differential carrier assembly, as set forth in claim 1, wherein said wall extends along said central axis to a mounting surface and said differential carrier further includes a cover extending over said mounting surface of said wall to at least partially cover said cavity.

6. An assembly, as set forth in claim 5, wherein said wall is formed from cast iron and said cover is formed from steel.

7. An assembly, as set forth in claim 5, further comprising at least one fastener extending through said cover and into said wall such that said cover is retained to said wall.

8. A differential carrier assembly, as set forth in claim 5, wherein said cover includes a central portion surrounding said central axis and a flange extending from said central portion wherein said flange extends over said mounting surface to at least partially cover said cavity.

9. A differential carrier assembly, as set forth in claim 8, wherein said central portion defines an access hole extending therethrough, along said central axis.

10. A differential carrier assembly, as set forth in claim 8, wherein said cover further includes a collar extending from said central portion and surrounding said central axis wherein said collar rotatably supports a bearing.

11. A differential carrier assembly, as set forth in claim 8, wherein said flange defines a secondary hole, wherein one of said roll pins extends through a respective one of said pin hole, said secondary hole, and said retention hole such that said stub shaft is retained to said differential carrier.

12. A differential carrier assembly, said assembly comprising:

a differential carrier extending along a central axis, wherein said differential carrier defines a chamber;

wherein said differential carrier includes a wall extending to a mounting surface and surrounding said central axis to at least partially defines said chamber;

a first stub shaft extending along a first rotational axis, transverse to said central axis, wherein said first stub shaft is disposed within said chamber and supported by said wall of said differential carrier;

a first pair of pinion gears disposed in spaced relationship on said first stub shaft and configured for rotation about said first rotational axis;

a pair of second stub shafts extending along a second rotational axis, transverse to said central axis and said first rotational axis, wherein each of said pair of second stub shafts is disposed within said chamber and supported by said wall of said differential carrier;

a second pair of pinion gears disposed in spaced relationship to one another on a respective one of said pair of second stub shafts and configured for rotation about said second rotational axis;

wherein said differential carrier includes a cover extending over said mounting surface of said wall to at least partially cover said cavity;

wherein said cover includes a central portion surrounding said central axis and a flange extending from said central portion, and said flange extends over said mounting surface to at least partially cover said cavity;

wherein said wall defines at least one pin hole, said flange defines a secondary hole, and one of said stub shafts defines a retention hole; and a roll pin extending through each of said pin hole, said secondary hole, and said retention hole such that said stub shaft is retained to said differential carrier wherein said wall defines at least one lubrication hole opening to said cavity, wherein said lubrication hole extends through said wall for scooping and directing a fluid into said cavity as said differential carrier rotates about said central axis;

wherein said wall includes an outer surface surrounding said chamber and an inner surface opposing said outer surface, whereby said lubrication hole extends through said wall from the outer surface to said inner surface;

wherein said lubrication hole includes a first edge and a second edge extending in spaced relationship to said first edge;

wherein each of said first edge and said second edge extend between said outer surface and said inner surface;

wherein said first edge extends at a first angle relative to said outer surface and said second edge extends at a second angle relative to said outer surface;

wherein said first angle is an acute angle and said second angle is an obtuse angle such that said lubrication hole is configured to scoop and direct fluid into said chamber of said differential carrier as said differential carrier rotates about said central axis.

* * * * *